United States Patent
He et al.

(10) Patent No.: US 10,066,157 B2
(45) Date of Patent: Sep. 4, 2018

(54) INJECTING POLYELECTROLYTE BASED SACRIFICIAL AGENTS FOR USE IN UNCONVENTIONAL FORMATIONS

(71) Applicant: HALLIBURTON ENERGY SERVICES, INC., Houston, TX (US)

(72) Inventors: Kai He, Kingwood, TX (US); Liang Xu, The Woodlands, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/895,854

(22) PCT Filed: Jul. 1, 2015

(86) PCT No.: PCT/US2015/038851
§ 371 (c)(1),
(2) Date: Dec. 3, 2015

(87) PCT Pub. No.: WO2016/004215
PCT Pub. Date: Jan. 7, 2016

(65) Prior Publication Data
US 2016/0222284 A1  Aug. 4, 2016

Related U.S. Application Data

(63) Continuation-in-part of application No. PCT/US2014/045253, filed on Jul. 2, 2014.

(51) Int. Cl.
*C09K 8/86* (2006.01)
*C09K 8/04* (2006.01)
*C09K 8/60* (2006.01)
*C09K 8/68* (2006.01)
*C09K 8/72* (2006.01)
*C09K 8/74* (2006.01)
*C09K 8/88* (2006.01)
*C09K 8/584* (2006.01)
*E21B 21/00* (2006.01)
*E21B 43/16* (2006.01)
*E21B 43/26* (2006.01)

(52) U.S. Cl.
CPC ............. *C09K 8/86* (2013.01); *C09K 8/04* (2013.01); *C09K 8/584* (2013.01); *C09K 8/602* (2013.01); *C09K 8/68* (2013.01); *C09K 8/72* (2013.01); *C09K 8/725* (2013.01); *C09K 8/74* (2013.01); *C09K 8/88* (2013.01); *E21B 21/00* (2013.01); *E21B 43/16* (2013.01); *E21B 43/26* (2013.01)

(58) Field of Classification Search
None
See application file for complete search history.

(56) References Cited

U.S. PATENT DOCUMENTS

| | | | | |
|---|---|---|---|---|
| 3,845,824 A | * | 11/1974 | Tinsley | E21B 43/26 166/308.2 |
| 4,044,833 A | | 8/1977 | Volz | |
| 4,235,290 A | * | 11/1980 | Kalfoglou | C09K 8/584 166/270.1 |
| 6,908,888 B2 | * | 6/2005 | Lee | C09K 8/536 166/300 |
| 8,383,556 B1 | | 2/2013 | Kaiser et al. | |
| 8,567,503 B2 | * | 10/2013 | Welton | C09K 8/524 166/305.1 |
| 2002/0193257 A1 | | 12/2002 | Lee et al. | |
| 2007/0087940 A1 | | 4/2007 | Qu et al. | |
| 2008/0011485 A1 | | 1/2008 | Monfreux-Gaillard et al. | |
| 2008/0096774 A1 | | 4/2008 | Tabrary et al. | |
| 2009/0107681 A1 | | 4/2009 | Hough et al. | |
| 2009/0111716 A1 | | 4/2009 | Hough et al. | |
| 2011/0105369 A1 | | 5/2011 | Reddy | |
| 2012/0264657 A1 | | 10/2012 | Van Zanten | |
| 2012/0285690 A1 | * | 11/2012 | Weaver | C09K 8/57 166/305.1 |
| 2013/0056213 A1 | | 3/2013 | Medvedev et al. | |

FOREIGN PATENT DOCUMENTS

WO 92/15769 A1 9/1992
WO 2015/020669 A1 2/2015

OTHER PUBLICATIONS

International Search Report and Written Opinion issued in related PCT Application No. PCT/US2014/045253, dated Nov. 2, 2015 (14 pages).
International Search Report and Written Opinion issued in related PCT Application No. PCT/US2015/038851, dated Sep. 22, 2015 (12 pages).
Shamsijazeyi et al., "Reducing Adsorption of Anionic Surfactant for Enhanced Oil Recovery: Part I. Competitive Adsorption Mechanism," Colloid. Surf. A: Physicochem. Eng. Aspects, vol. 453 (2014), pp. 162-167.
Shamsijazeyi et al., "Reducing Adsorption of Anionic Surfactants for Enhanced Oil Recovery: Part II. Applied Aspects", Colloid. Surf. A: Physicochem. Eng. Aspects, vol. 453 (2014), pp. 168-175.
Shamsijazeyi et al., Sacrificial Agent for Reducing Adsorption of Anionic Surfactants, SPE 164061-MS, 2013.
Gao et al, Interface-Induced Disassembly of a Self-Assembled Two-Component Nanoparticle System. Langmuir, 29(11), 3654-3661, 2013.

(Continued)

*Primary Examiner* — Angela M DiTrani
(74) *Attorney, Agent, or Firm* — Tenley Krueger; Baker Botts L.L.P.

(57) ABSTRACT

Compositions and methods for formulating treatment fluids that comprise a surfactant having reduced and delayed adsorption. In one embodiment, the method comprises: introducing a first treatment fluid comprising an aqueous base fluid and a polyelectrolyte into a wellbore penetrating at least a portion of a subterranean formation; contacting at least a portion of the subterranean formation with the polyelectrolyte; and introducing a second treatment fluid comprising an aqueous base fluid and a surfactant into the wellbore penetrating at least the portion of the subterranean formation.

16 Claims, 12 Drawing Sheets

(56) References Cited

OTHER PUBLICATIONS

Sarrazin-Cartalas, et al. "Association and thermal gelation in mixtures of hydrophobically modified polyelectrolytes and nonionic surfactants," Langmuir, 1994, vol. 10, No. 5, pp. 1421-1426.

International Preliminary Report on Patentability issued in related Application No. PCT/US2014/045253, dated Jan. 12, 2017 (10 pages).

International Preliminary Report on Patentability issued in related Application No. PCT/US2015/038851, dated Jan. 12, 2017 (7 pages).

* cited by examiner

US 10,066,157 B2

INJECTING POLYELECTROLYTE BASED SACRIFICIAL AGENTS FOR USE IN UNCONVENTIONAL FORMATIONS

CROSS-REFERENCE TO RELATED APPLICATIONS

The present application is a U.S. National Stage Application of International Application No. PCT/US2015/038851 filed Jul. 1, 2015, which is a continuation-in-part of International Application No. PCT/US2014/45253 filed Jul. 2, 2014.

BACKGROUND

The present disclosure provides compositions and methods for treating subterranean formations using surfactants.

Treatment fluids can be used in a variety of subterranean treatment operations. As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid. Illustrative treatment operations can include, for example, fracturing operations, gravel packing operations, acidizing operations, scale dissolution and removal, consolidation operations, and the like.

Surfactants are widely used in treatment fluids for drilling operations and other well treatment operations, including hydraulic fracturing and acidizing (both fracture acidizing and matrix acidizing) treatments. Surfactants may also be used in enhanced or improved oil recovery operations. Many variables may affect the selection of a surfactant for use in such treatments and operations, such as interfacial surface tension, wettability, compatibility with other additives (such as other additives used in acidizing treatments), and emulsification tendency. Surfactant is an important component in treatment fluids for ensuring higher productivity from unconventional oil and gas formations.

However, adsorption of the surfactant onto reservoir rocks and/or proppant particulates can lead to inefficient use. Adsorption is the adherence of a thin layer of molecules to the surface of a solid. For example, a surfactant with an ionic functional group may adsorb onto a surface of a reservoir rock and/or proppant particle having an opposite ionic charge. When the surfactant adsorbs onto the surface of a reservoir rock and/or proppant particle, it is no longer available in the treatment fluid for its intended use. Strong adsorption can potentially limit the availability of surfactant in reservoirs as much of the surfactant may be adsorbed near then wellbore before it reaches the interior of the reservoir.

BRIEF DESCRIPTION OF THE DRAWINGS

These drawings illustrate certain aspects of some of the embodiments of the present disclosure, and should not be used to limit or define the claims.

Figure 1:
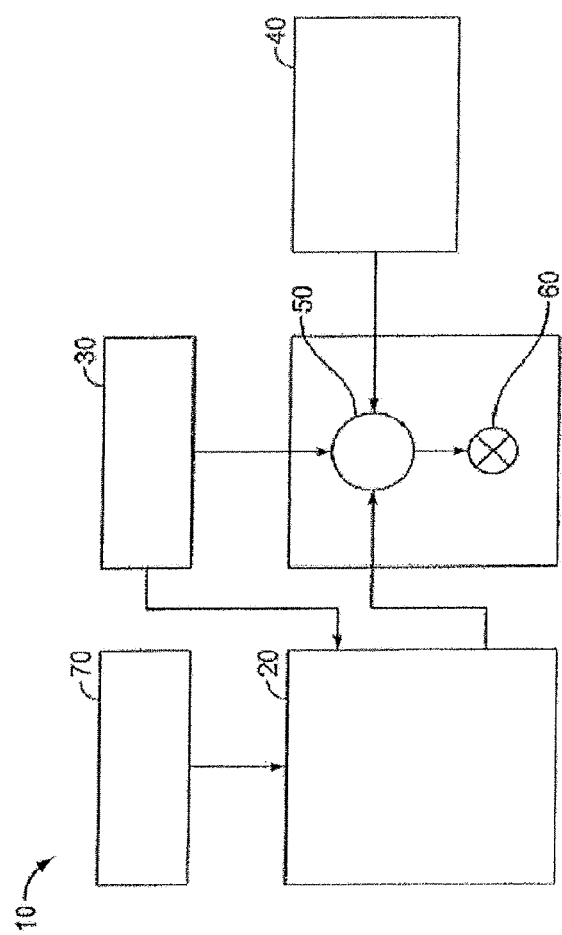
FIG. 1 is a diagram illustrating an example of a fracturing system that may be used in accordance with certain embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF EMBODIMENTS

The present disclosure provides compositions and methods for treating subterranean formations. More particularly, the present disclosure relates to treatment fluids that comprise a surfactant having reduced and delayed adsorption.

There may be several potential advantages to the methods and compositions of the present disclosure, only some of which are alluded to herein. The exposure of ionic surfactants to oppositely charged formation rocks, especially in carbonate rich rocks, can result in a large amount of adsorption of surfactants to the rock surface. The present disclosure provides a new approach by using polyelectrolytes, such as polyacrylate, in addition to the surfactant package. This may significantly reduce and delay the adsorption of surfactants in hydraulic fracturing applications for unconventional reservoirs and potentially increase the oil recovery. In certain embodiments, the polyelectrolytes and the surfactants may be introduced into a subterranean formation simultaneously. In other embodiments, the polyelectrolytes and the surfactants may be introduced into a subterranean formation sequentially, with the introduction of the polyelectrolyte preceding the introduction of the surfactant.

In accordance with embodiments of the present disclosure involving simultaneous introduction, a combined treatment fluid may comprise an aqueous base fluid, a surfactant, and a polyelectrolyte. The combined treatment fluid may comprise additional components, including but not limited to, cross-linked gel, scale inhibitor, paraffin dispersant or inhibitor, friction reducer, corrosion inhibitor, biocide, clay stabilizer, and emulsion breakers. In certain embodiments, the combined treatment fluid is a fracturing fluid. However, the teachings of the present disclosure may be used in other treatment or subterranean fluids, including but not limited to, acidizing fluids and drilling fluids.

In accordance with embodiments of the present disclosure involving sequential introduction, a first treatment fluid and a second treatment fluid may be used. The first treatment fluid may comprise an aqueous base fluid and a polyelectrolyte. The second treatment fluid may comprise an aqueous base and a surfactant. The first and second treatment fluids may also comprise additional components, including but not limited to, cross-linked gel, scale inhibitor, paraffin dispersant or inhibitor, friction reducer, corrosion inhibitor, biocide, clay stabilizer, and emulsion breakers. In certain embodiments, the second treatment fluid is a fracturing fluid. However, the teachings of the present disclosure may be used in other treatment or subterranean fluids, including but not limited to, acidizing fluids and drilling fluids.

The aqueous base fluid used in some embodiments of the treatment fluids of the present disclosure may comprise fresh water, saltwater (e.g., water containing one or more salts dissolved therein), brine (e.g., saturated saltwater), seawater, or any combination thereof. Generally, the water may be from any source, provided that it does not contain components that might adversely affect the stability of the treatment fluids of the present disclosure. One of ordinary skill in the art, with the benefit of this disclosure, will recognize what components might adversely affect the stability and/or performance of the treatment fluids of the present disclosure.

The surfactant may in some embodiments be anionic, while in other embodiments it may be cationic, or in yet other embodiments, amphoteric, zwitterionic, or non-ionic, respectively. In some embodiments, the desired ionization, if any, of the surfactant may be determined based at least in part upon one or more characteristics of the oil and/or gas of a subterranean formation. For example, the charge of a surfactant of some embodiments of the treatment fluid may allow the surfactant to induce pair interactions (e.g., electrostatic interactions) with one or more molecules of oil and/or gas in the subterranean formation.

Thus, where the oil and/or gas of a subterranean formation contains predominantly alkaline compounds, which are typically positively charged in nature, the surfactant of some embodiments of the present disclosure may be anionic to allow the surfactant to induce electrostatic pair interactions with positively-charged oil and/or gas molecules. Suitable anionic surfactants may include, but are not limited to: sodium, potassium, and ammonium salts of long chain alkyl sulfonates and alkyl aryl sulfonates (such as sodium dodecylbenzene sulfonate); dialkyl sodium sulfosuccinates (such as sodium dodecylbenzene sulfonate or sodium bis-(2-ethylthioxyl)-sulfosuccinate); alkyl sulfates (such as sodium lauryl sulfate); alkyl sulfonates (such as methyl sulfonate, heptyl sulfonate, decylbenzene sulfonate, dodecylbenzene sulfonate); and alkoxylated sulfates. Certain embodiments of the present disclosure may include a combination of anionic surfactants.

In some instances, the oil and/or gas of a subterranean formation may contain a mixture of alkaline and acidic compounds. In such a circumstance, it may be advantageous to use an amphoteric and/or zwitterionic surfactant according to some embodiments of the present disclosure. Furthermore, the amphoteric and/or zwitterionic surfactants of some embodiments may exhibit different charge and/or reactivity at different ranges of pH. For instance, some surfactants that are amphoteric and/or zwitterionic at pH less than about 2 may become anionic, cationic, or non-ionic at pH greater than about 2. Because the downhole pH may change during acidization (for example, pH may rise from levels of from about 0-1 to about 4, as the acid is spent), the characteristics of surfactants of some embodiments may change during the process of an acidization treatment.

Other characteristics of oil and/or gas within the formation that might affect the determination of desired surfactant charge include, but are not limited to: weight percentages of saturates, aromatics, resins and asphaltenes.

Suitable non-ionic surfactants of some embodiments may include, but are not limited to: ethoxylated alcohols and polyglucosides. In some embodiments, non-ionic surfactants may include ethoxylated long-chain alcohols (e.g., ethoxylated dodecanol). Ethoxylation may take place at any point along the alcohol. Suitable cationic surfactants of some embodiments may include, but are not limited to: alkyl ammonium bromides. In some embodiments, the alkyl chain of the alkyl ammonium bromide may be anywhere from 1 to 50 carbons long, and be branched or un-branched. Thus, an example embodiment may include an alkyl ammonium bromide that comprises a 16-carbon chain alkyl component (e.g., cetyl trimethyl ammonium bromide). Suitable amphoteric and/or zwitterionic surfactants of some embodiments may include, but are not limited to, hydroxysultaines (e.g., cocoamidopropyl hydroxysultaine, lauramidopropyl hydroxysultaine, lauryl hydroxysultaine, etc.).

In some embodiments, the surfactant may be present in a treatment fluid in an amount sufficient to form one or more relatively short-lived oil-in-acid or oil-in-water emulsions within a subterranean formation. For example, in some embodiments, the surfactant may be present in the treatment fluid in an amount of from about 0.1 to 50 gallons of surfactant per thousand gallons of acid, water, and/or other aqueous base fluid ("gpt"), or put another way, approximately 100 to 50,000 ppm. In other example embodiments, the surfactant may be present in the treatment fluid in an amount of from about 2 to 40 gpt (approximately 2,000 ppm to 40,000 ppm), or in other embodiments, from about 3 to 25 gpt (approximately 3,000 ppm to about 25,000 ppm). In some embodiments, the surfactant may be present in the treatment fluid in an amount of from about 4 gpt to about 18 gpt (approximately 4,000 ppm to 18,000 ppm). In some embodiments, surfactant may be added to a treatment fluid in place of one or more other components that would otherwise conventionally be present (e.g., penetrating surfactants or anti-sludge agents). In such embodiments, an amount of surfactant on the higher end of the above ranges may be desired.

The polyelectrolyte may be any polyelectrolyte that is capable of adsorbing to the formation and/or proppant particle surface. In certain embodiments, the polyelectrolyte is a polyacrylate. In other embodiments, the polyelectrolyte may comprise poly(styrenesulfonic acid), poly(2-acrylamido-2-methyl-1-propane sulfonic acid), sulfonated poly (ether ether ketone), sulfonated lignin, poly(ethylenesulfonic acid), poly(methacryloxyethylsulfonic acid), poly (acrylic acid), poly(methacrylic acid), HV-sodium alginate, sodium alginate, sodium hyaluronate, heparin sulfate, cellulose sulfate, kappa carrageenan, pentasodium tripolyphosphate, low-esterified pectin(polygalacturonic acid), polyglutamic acid, carboxymethylcellulose, chondroitin sulfate-6, chondroitin sulfate-4, collagen, polyalkylene imines, polyethylene polyamine, polypropylene polyamine, polyvinylamine, polyallylamine, poly(vinylalcohol/vinylamine), chitosan, polylysine, polymyxin, spermine hydrochloride, protamine sulfate, poly(methylene-co-guanidine) hydrochloride, polythethylenimine-ethoxylated, polyethylenimine-ex-ichlorhydrin modified, and combinations thereof. However, suitable polyelectrolytes may include any charged molecule with multiple adsorption sites.

Polyelectrolytes of the present disclosure may range in size from a molecular weight of about 100 to about 300,000 Daltons. In some embodiments, the polyelectrolytes may range in size from a molecular weight of about 100 to about 30,000 Daltons. In other embodiments, the polyelectrolytes may range in size from about 1 Å to about 100 µm. It has been observed that polyelectrolytes with a lower molecular weight may be more effective at delaying the adsorption of the surfactant in certain embodiments of the present disclosure.

In certain embodiments, particularly embodiments where the components are introduced simultaneously, the polyelectrolytes may associate with the surfactant directly to form an aggregate. In these embodiments, the polyelectrolyte may have the opposite charge as the surfactant. For example, where the surfactant is anionic, a cationic surfactant may be chosen. Without limiting the disclosure to any particular theory or mechanism, the electrostatic attraction between the oppositely charged surfactant and polyelectrolyte may drive the two molecules to form an aggregate. This in turn may prevent the surfactant from adsorbing to the surface of the rock surface reservoir because it is already attached to the polyelectrolyte. Thus, the surfactant may be pumped deeper into the reservoir, at which point the aggregate may be disassembled through a variety of mechanisms. For example, phase equilibrium of polyelectrolyte complex is associated with the salinity; therefore, change of salinity could lead to disassembly of the aggregates. Temperature gradient and pH changes may also break up the complexes.

In other embodiments, including both embodiments where the components are introduced simultaneously and embodiments where the components are introduced sequentially, the polyelectrolyte acts as a sacrificial agent. In these embodiments, the polyelectrolyte has the same charge as the surfactant. For example, where the surfactant is anionic, an anionic polyelectrolyte is chosen as well. Without limiting the disclosure to any particular theory or mechanism, the polyelectrolyte may have better or multiple adsorption sites than the surfactant. As a result, in the case of an anionic polyelectrolyte, the polyelectrolyte may adsorb to the cationic surface of the reservoir formation (e.g., carbonates) before the surfactant. The polyelectrolyte may therefore prevent the surfactant from adsorbing to the surface by competitive binding, i.e., the polyelectrolyte physically blocks the surfactant from adsorbing by taking the available binding locations. In addition, the polyelectrolyte may produce a charge on the surface of the reservoir formation that creates an electrostatic repulsion for the like-charged surfactant. Both mechanisms may work together to reduce the adsorption of the like-charged surfactant onto the surface.

In embodiments where the polyelectrolyte and the surfactant are introduced sequentially, the polyelectrolyte may adsorb to the surface of the reservoir formation before the surfactant is introduced into or reaches a particular portion of the subterranean formation. In some circumstances, this may be more effective than introducing the polyelectrolyte and the surfactant simultaneously because the two components are not in direct competition for binding locations. In these embodiments, the polyelectrolyte may function more completely as a sacrificial agent, resulting in fewer places for the surfactant to adsorb on the surface. Similarly, the polyelectrolyte may coat the formation surface more completely and more effectively repel a surfactant having a like charge.

The treatment fluids of the present disclosure may optionally include other components such as acids, solvents, particulates, or other compounds as long as these components do not interfere with the surfactant or the ability of the polyelectrolyte to delay the adsorption of the surfactant. A person of skill in the art with the benefit of this disclosure would be able to select the appropriate other components depending on the desired treatment fluid. For example, the person of skill in the art might include the optional acid if it is desired to produce an acidizing treatment fluid. A person of skill in the art might also include particulates if it is desired to produce a fracturing fluid with proppant particles.

The acid optionally used in some embodiments of the treatment fluids of the present disclosure may comprise any acid suitable for use in acidizing treatments, such as matrix acidizing or fracture acidizing. However, it will be appreciated that the acid should not change the charge of the polyelectrolyte in a way that interferes with its ability to prevent or delay the adsorption of the surfactant. For example, the electrical charge of the polyelectrolyte may vary with the pH of the treatment fluid. A particular type or concentration of acid that results in an undesirable charge should not be chosen.

Examples of suitable acids for use in various embodiments include, but are not limited to: hydrochloric acid, hydrofluoric acid, formic acid, acetic acid, citric acid, glycolic acid, hydroxyacetic acid, lactic acid, hydrofluoric acid, 3-hydroxypropionic acid, carbonic acid, and ethylenediaminetetraacetic acid. An example of a suitable commercially available acid is "VOLCANIC ACID II™" available from Halliburton Energy Services, Inc. Alternatively or in combination with one or more acids, the treatment fluids of the present disclosure may comprise a salt of an acid. A "salt" of an acid, as that term is used herein, refers to any compound that shares the same base formula as the referenced acid, but one of the hydrogen cations thereon is replaced by a different cation (e.g., an antimony, bismuth, potassium, sodium, calcium, magnesium, cesium, or zinc cation). Examples of suitable salts of acids include, but are not limited to, sodium acetate, sodium formate, sodium citrate, sodium hydroxyacetate, sodium lactate, sodium fluoride, sodium propionate, sodium carbonate, calcium acetate, calcium formate, calcium citrate, calcium hydroxyacetate, calcium lactate, calcium fluoride, calcium propionate, calcium carbonate, cesium acetate, cesium formate, cesium citrate, cesium hydroxyacetate, cesium lactate, cesium fluoride, cesium propionate, cesium carbonate, potassium acetate, potassium formate, potassium citrate, potassium hydroxyacetate, potassium lactate, potassium fluoride, potassium propionate, potassium carbonate, magnesium acetate, magnesium formate, magnesium citrate, magnesium hydroxyacetate, magnesium lactate, magnesium fluoride, magnesium propionate, magnesium carbonate, zinc acetate, zinc formate, zinc citrate, zinc hydroxyacetate, zinc lactate, zinc fluoride, zinc propionate, zinc carbonate, antimony acetate, antimony formate, antimony citrate, antimony hydroxyacetate, antimony lactate, antimony fluoride, antimony propionate, antimony carbonate, bismuth acetate, and bismuth formate, bismuth citrate, bismuth hydroxyacetate, bismuth lactate, bismuth fluoride, bismuth carbonate, and bismuth propionate. The treatment fluids of some embodiments of the present disclosure may include any combination of two or more acids and/or salts thereof.

The optional acid (and/or salts thereof) may be present in the treatment fluids of some embodiments of the present disclosure in an amount sufficient to make the treatment fluid acidic. In some embodiments, the pH may be less than about 7. In other embodiments, the pH of the treatment fluid may be less than about 6, or in other embodiments, less than about 5. In some embodiments, the treatment fluid may be strongly acidic (e.g., having a pH less than about 3, or in other embodiments, less than about 2). In some embodiments, pH may be approximately 0. For example, in some embodiments the acid (and/or salts thereof) may be present in the range of from about 1% by weight of the treatment fluid to about 30% by weight of the treatment fluid. In certain embodiments, the acid (and/or salts thereof) may be present in the treatment fluid in the range of from about 5% by weight of the treatment fluid to about 20% by weight of the treatment fluid. In other embodiments, the treatment fluid may be 100% acid (prior to addition of surfactant and any other additives discussed herein).

The treatment fluids of some embodiments may include solvents, such as methanol, ethylene glycol, xylene, toluene, aromatics, or butyl glycol. Thus, for example, a treatment fluid of some embodiments may include ethylene glycol mono-butyl ether.

The treatment fluids of some embodiments may include particulates (such as proppant particulates or gravel particulates) suitable for use in subterranean applications. Particulates suitable for use in the present disclosure may comprise any material suitable for use in subterranean operations. Proppant particulates may be used in conjunction with hydraulic fracturing to prevent the fractures from fully closing upon the release of hydraulic pressure, forming conductive channels through which fluids may flow to the wellbore.

Suitable particulate materials include, but are not limited to, sand, bauxite, ceramic materials, glass materials, polymer materials, Teflon® materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and any combination thereof. Suitable composite particulates may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and any combination thereof. The particulate size generally may range from about 2 mesh to about 400 mesh on the U.S. Sieve Series; however, in certain circumstances, other sizes may be desired and will be entirely suitable for practice of the present disclosures. In particular embodiments, preferred particulates size distribution ranges are one or more of 6/12, 8/16, 12/20, 16/30, 20/40, 30/50, 40/60, 40/70, or 50/70 mesh. It should be understood that the term "particulate," as used in this disclosure, includes all known shapes of materials, including substantially spherical materials, fibrous materials, polygonal materials (such as cubic materials), and mixtures thereof. Moreover, fibrous materials, that may or may not be used to bear the pressure of a closed fracture, are often included in fracturing and sand control treatments. In certain embodiments, the particulates included in the treatment fluids of some embodiments of the present disclosure may be coated with any suitable resin or tackifying agent known to those of ordinary skill in the art.

The treatment fluids of some embodiments may additionally or instead include one or more of a variety of well-known additives, such as gel stabilizers, salts, fluid loss control additives, scale inhibitors, organic corrosion inhibitors, catalysts, clay stabilizers, biocides, bactericides, friction reducers, gases, foaming agents, iron control agents, solubilizers, pH adjusting agents (e.g., buffers), and the like. In certain embodiments, the treatment fluids may include salts (e.g., $MgCl_2$) that may, inter alia, prevent the precipitation of calcium when such treatment fluids are used to acidize formations containing calcium carbonate. Those of ordinary skill in the art, with the benefit of this disclosure, will be able to determine the appropriate additives for a particular application.

The treatment fluids of the present disclosure may be prepared by any suitable method. In some embodiments, the treatment fluids may be prepared on the job site. As an example of such an on-site method, the optional additional components may be added to the treatment fluid (e.g., a hydraulic fracturing fluid, a fracture acidizing fluid, or a matrix acidizing fluid) during pumping.

Furthermore, additional additives, as discussed above, may be combined with the treatment fluids and/or the aqueous base fluid as desired. For example, a particulate additive (e.g., a particulate scale inhibitor) or particulates (e.g., gravel particulates or proppant particulates) may be suspended in the treatment fluid. In some embodiments, to facilitate mixing with the aqueous base fluid and the acid, the surfactant may be combined with a surfactant solubilizer prior to its combination with the other components of the treatment fluid. The surfactant solubilizer may be any suitable surfactant solubilizer, such as water, simple alcohols, and any combination thereof. For example, in some embodiments, the surfactant may be provided in a mixture that comprises the surfactant solubilizer and the surfactant. One of ordinary skill in the art, with the benefit of this disclosure, will be able to determine other suitable methods for preparation of the treatment fluids.

The present disclosure in some embodiments provides methods for using the treatment fluids to carry out a variety of subterranean treatments, including but not limited to, hydraulic fracturing treatments, acidizing treatments, and drilling fluids. In some embodiments, the treatment fluids of the present disclosure may be used in treating a portion of a subterranean formation, for example, in acidizing treatments such as matrix acidizing or fracture acidizing. In certain embodiments (for example, where the polyelectrolyte and surfactant are introduced simultaneously), a combination treatment fluid may be introduced into a subterranean formation. In some embodiments, the combination treatment fluid may be introduced into a well bore that penetrates a subterranean formation. In some embodiments, the combination treatment fluid may be introduced at a pressure sufficient to create or enhance one or more fractures within the subterranean formation (e.g., hydraulic fracturing).

In some embodiments, the combination treatment fluid further comprising an acid may be introduced at a pressure sufficient to cause at least a portion of the combination treatment fluid to penetrate at least a portion of the subterranean formation, and the treatment fluid may be allowed to interact with the subterranean formation so as to create one or more voids in the subterranean formation (for example, in acidizing treatments). Introduction of the combination treatment fluid may in some of these embodiments be carried out at or above a pressure sufficient to create or enhance one or more fractures within the subterranean formation (e.g., fracture acidizing). In other embodiments, introduction of the combination treatment fluid may be carried out at a pressure below that which would create or enhance one or more fractures within the subterranean formation (e.g., matrix acidizing).

Similar steps may be performed in embodiments where the polyelectrolyte and surfactant are introduced sequentially. According to these embodiments, the first treatment fluid comprising the polyelectrolyte is introduced into the subterranean formation. Then, the second treatment fluid comprising the surfactant is introduced in to the subterranean formation. Depending on the desired result of the treatment, the second treatment fluid comprising the surfactant may be introduced at a pressure sufficient to create or enhance one or more fractures within the subterranean formation (e.g., hydraulic fracturing). In certain embodiments, the second treatment fluid may further comprise an acid.

The embodiments of the present disclosure may be well suited for unconventional formations including Eagle ford, Barnett, Bakken, Wolfcamp and Woodfood, etc. As used in this disclosure, the term "unconventional formations" generally refers to low permeability and low porosity tight rock formations. These unconventional formations typically have a higher surface area than other subterranean formations which leads to a greater potential for the adsorption of the surfactant. The experiments discussed below suggest that the embodiments of the present disclosure worked surprisingly well in connection with the typical geology of unconventional wells, including shale play formations.

The exemplary methods and compositions disclosed herein may directly or indirectly affect one or more components or pieces of equipment associated with the preparation, delivery, recapture, recycling, reuse, and/or disposal of the disclosed compositions. For example, and with reference to FIG. 1, the disclosed methods and compositions may directly or indirectly affect one or more components or pieces of equipment associated with an exemplary fracturing system 10, according to one or more embodiments. In certain instances, the system 10 includes a fracturing fluid producing apparatus 20, a fluid source 30, a proppant source 40, and a pump and blender system 50 and resides at the surface at a well site where a well 60 is located. In certain instances, the fracturing fluid producing apparatus 20 combines a gel pre-cursor with fluid (e.g., liquid or substantially liquid) from fluid source 30, to produce a hydrated fracturing fluid that is used to fracture the formation. The hydrated fracturing fluid can be a fluid for ready use in a fracture stimulation treatment of the well 60 or a concentrate to which additional fluid is added prior to use in a fracture stimulation of the well 60. In other instances, the fracturing fluid producing apparatus 20 can be omitted and the fracturing fluid sourced directly from the fluid source 30. In certain instances, the fracturing fluid may comprise water, a hydrocarbon fluid, a polymer gel, foam, air, wet gases and/or other fluids.

The proppant source 40 can include a proppant for combination with the fracturing fluid. The system may also include additive source 70 that provides one or more additives (e.g., gelling agents, weighting agents, and/or other optional additives) to alter the properties of the fracturing fluid. For example, the other additives 70 can be included to reduce pumping friction, to reduce or eliminate the fluid's reaction to the geological formation in which the well is formed, to operate as surfactants, and/or to serve other functions.

The pump and blender system 50 receives the fracturing fluid and combines it with other components, including proppant from the proppant source 40 and/or additional fluid from the additives 70. The resulting mixture may be pumped down the well 60 under a pressure sufficient to create or enhance one or more fractures in a subterranean zone, for example, to stimulate production of fluids from the zone. Notably, in certain instances, the fracturing fluid producing apparatus 20, fluid source 30, and/or proppant source 40 may be equipped with one or more metering devices (not shown) to control the flow of fluids, proppants, and/or other compositions to the pumping and blender system 50. Such metering devices may permit the pumping and blender system 50 can source from one, some or all of the different sources at a given time, and may facilitate the preparation of fracturing fluids in accordance with the present disclosure using continuous mixing or "on-the-fly" methods. Thus, for example, the pumping and blender system 50 can provide just fracturing fluid into the well at some times, just proppants at other times, and combinations of those components at yet other times.

Figure 2:
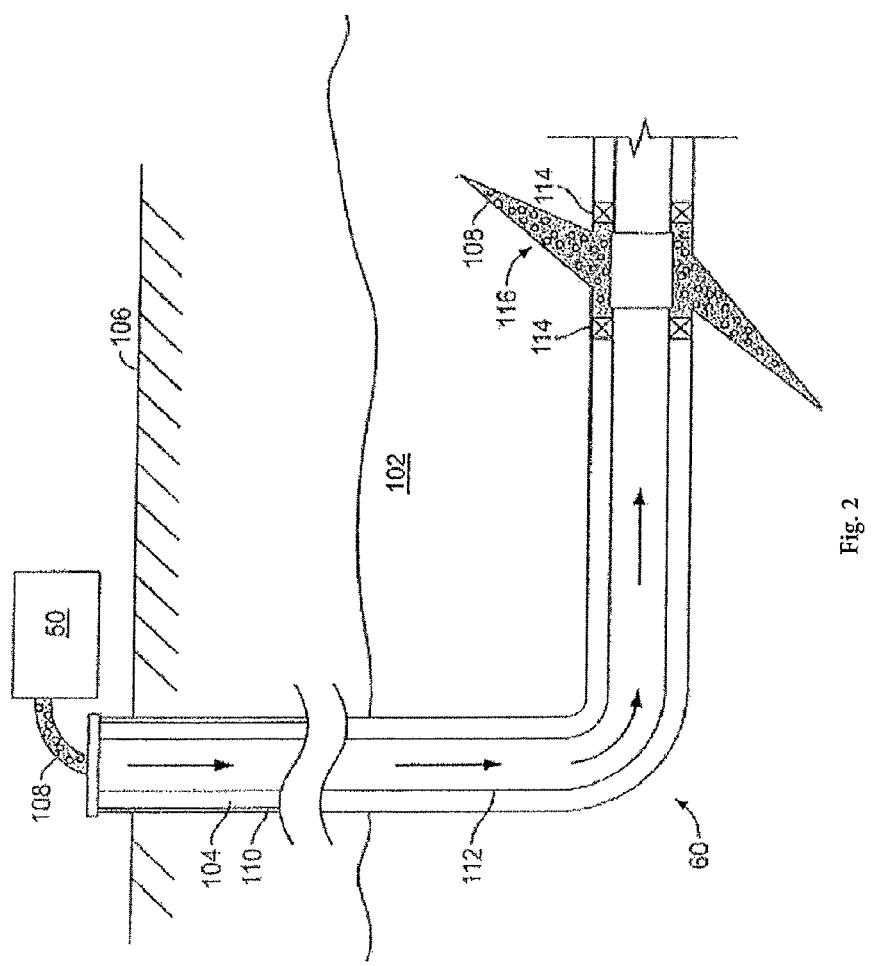
FIG. 2 is a diagram illustrating an example of a subterranean formation in which a fracturing operation may be performed in accordance with certain embodiments of the present disclosure.

FIG. 2 shows the well 60 during a fracturing operation in a portion of a subterranean formation of interest 102 surrounding a well bore 104. The well bore 104 extends from the surface 106, and the fracturing fluid 108 is applied to a portion of the subterranean formation 102 surrounding the horizontal portion of the well bore. Although shown as vertical deviating to horizontal, the well bore 104 may include horizontal, vertical, slant, curved, and other types of well bore geometries and orientations, and the fracturing treatment may be applied to a subterranean zone surrounding any portion of the well bore. The well bore 104 can include a casing 110 that is cemented or otherwise secured to the well bore wall. The well bore 104 can be uncased or include uncased sections. Perforations can be formed in the casing 110 to allow fracturing fluids and/or other materials to flow into the subterranean formation 102. In cased wells, perforations can be formed using shape charges, a perforating gun, hydro-jetting and/or other tools.

The well is shown with a work string 112 depending from the surface 106 into the well bore 104. The pump and blender system 50 is coupled a work string 112 to pump the fracturing fluid 108 into the well bore 104. The working string 112 may include coiled tubing, jointed pipe, and/or other structures that allow fluid to flow into the well bore 104. The working string 112 can include flow control devices, bypass valves, ports, and or other tools or well devices that control a flow of fluid from the interior of the working string 112 into the subterranean zone 102. For example, the working string 112 may include ports adjacent the well bore wall to communicate the fracturing fluid 108 directly into the subterranean formation 102, and/or the working string 112 may include ports that are spaced apart from the well bore wall to communicate the fracturing fluid 108 into an annulus in the well bore between the working string 112 and the well bore wall.

The working string 112 and/or the well bore 104 may include one or more sets of packers 114 that seal the annulus between the working string 112 and well bore 104 to define an interval of the well bore 104 into which the fracturing fluid 108 will be pumped. FIG. 2 shows two packers 114, one defining an uphole boundary of the interval and one defining the downhole end of the interval. When the fracturing fluid 108 is introduced into well bore 104 (e.g., in FIG. 2, the area of the well bore 104 between packers 114) at a sufficient hydraulic pressure, one or more fractures 116 may be created in the subterranean zone 102. The proppant particulates in the fracturing fluid 108 may enter the fractures 116 where they may remain after the fracturing fluid flows out of the well bore. These proppant particulates may "prop" fractures 116 such that fluids may flow more freely through the fractures 116.

While not specifically illustrated herein, the disclosed methods and compositions may also directly or indirectly affect any transport or delivery equipment used to convey the compositions to the fracturing system 10 such as, for example, any transport vessels, conduits, pipelines, trucks, tubulars, and/or pipes used to fluidically move the compositions from one location to another, any pumps, compressors, or motors used to drive the compositions into motion, any valves or related joints used to regulate the pressure or flow rate of the compositions, and any sensors (i.e., pressure and temperature), gauges, and/or combinations thereof, and the like.

EXAMPLES

To facilitate a better understanding of the present disclosure, the following examples of certain aspects of some embodiments are given. In no way should the following examples be read to limit or define the scope of the claims.

Example 1

A static bottle test was performed to demonstrate the ability of polyacrylate (a representative polyelectrolyte) to interact with shale formation rocks, which are commonly found in reservoir formations. Four vials were prepared that each contained water. As described in Table 1 below, the samples also contained different combinations of the following components: surfactant blend (a blend of anionic and nonionic surfactants) at a concentration of 1 GPT (gallons per thousand gallons) 10 grams of shale core powder, and a 4500 molecular weight polyacrylate at a concentration of 2.5 GPT.

TABLE 1

Sample Compositions for Static Bottle Test

| Sample Number | Surfactant | Shale Core Powder | Polyelectrolyte |
|---|---|---|---|
| 1 | Blend at 1 GPT | 10 g | None |
| 2 | Blend at 1 GPT | 10 g | SP (MW = 4500) at 2.5 GPT |
| 3 | Blend at 1 GPT | None | None |
| 4 | Blend at 1 GPT | None | SP (MW = 4500) at 2.5 GPT |

Figure 3:
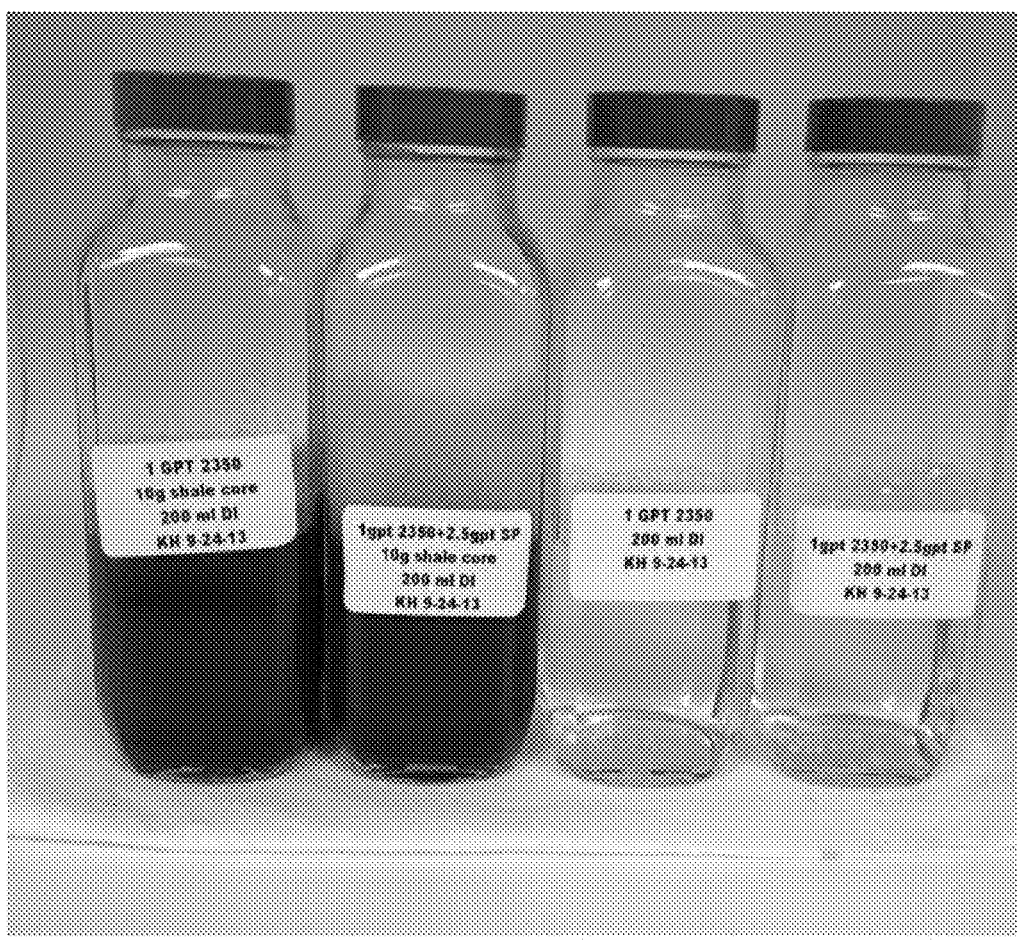
FIG. 3 is a photograph, taken immediately after sample preparation, showing the results of a static bottle test to demonstrate the effect of polyacrylate in a sample.
Figure 4:
FIG. 4 is a photograph, taken 4 hours after sample preparation, showing the results of a static bottle test to demonstrate the effect of polyacrylate in a sample.
Figure 5:
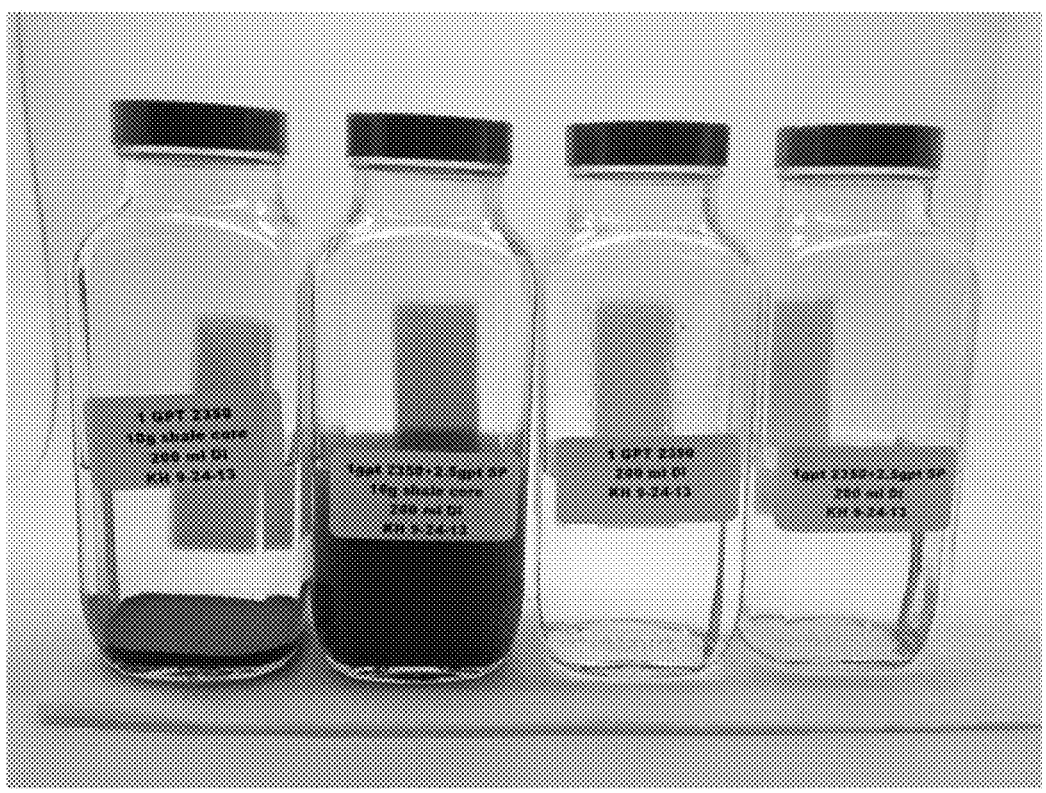
FIG. 5 is a photograph, taken 9 days after sample preparation, showing the results of a static bottle test to demonstrate the effect of polyacrylate in a sample.

After mixing the samples, the vials were arranged from left to right in numerical order and allowed to rest. FIGS. 3, 4, and 5 are photographs that show the samples immediately after preparation (FIG. 3), after 4 hours (FIG. 4), and after 9 days (FIG. 5). As can be seen in the figures, the shale core powder in Sample 1 began precipitating and settling almost immediately. Noticeable precipitating had occurred after 4 hours and complete precipitation had occurred after 9 days. In contrast, the shale core powder in Sample 2 remained dispersed in the solution even after 9 days.

The results demonstrate that the shale core particles did not precipitate in the presence of the polyacrylate, indicating a strong interaction between the polyacrylate and the shale formation rocks.

Example 2

A static adsorption test was performed to investigate the adsorption of the surfactant with and without polyelectrolytes. In particular, a dynamic surface tension measurement was taken for the various samples positions described in Table 2 using a bubble pressure tensiometer such as Krüss BP100.

TABLE 2

Sample Compositions for Static Adsorption Test

| Sample Number | Surfactant | Shale Core Powder | Polyelectrolyte |
|---|---|---|---|
| 1 | Blend at 1 GPT | None | None |
| 2 | Blend at 1 GPT | None | SP (MW = 1200) at 2.5 GPT |
| 3 | Blend at 1 GPT | None | SP (MW = 4500) at 2.5 GPT |
| 4 | Blend at 1 GPT | None | SP (MW = 15000) at 2.5 GPT |
| 5 | Blend at 1 GPT | 10 g | None |
| 6 | Blend at 1 GPT | 10 g | SP (MW = 1200) at 2.5 GPT |
| 7 | Blend at 1 GPT | 10 g | SP (MW = 4500) at 2.5 GPT |
| 8 | Blend at 1 GPT | 10 g | SP (MW = 15000) at 2.5 GPT |

Dynamic surface tension measurements typically record the surface tension reduction as a function of time. It is believed that as time elapses, there is sufficient time available for more surfactant molecules to travel to and accumulate at the interface. Those molecules then pack tightly at the interface and hence lower the surface tensions. The adsorption process can be modeled by the Ward-Tordai equation:

$$Ïf_t = Ïf_o - 2RTC\left(\frac{D_s t}{π}\right)^{0.5} \qquad (1)$$

Where the parameter c, R, T, $D_s$, $Ïf_t$ and $Ïf_o$ are bulk molar surfactant concentration, universal gas constant, absolute temperature, diffusion coefficient, surface tension at surface age and surface tension of the pure solvent. According to the equation 1, a lower surface tension at surface age t indicates a higher bulk surfactant concentration C.

Figure 6:
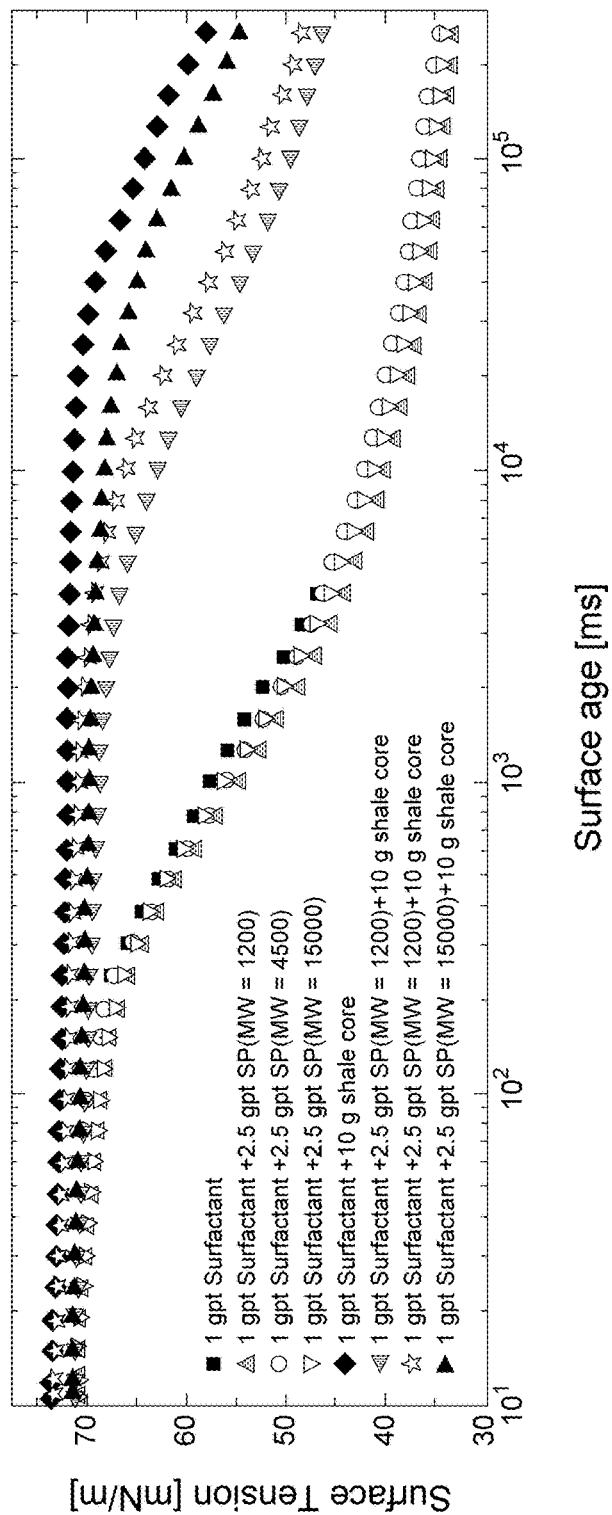
FIG. 6 is a graph that illustrates the results of a static adsorption test of embodiments of the present disclosure.

As shown in FIG. 6, it can be observed that, compared to the pure surfactants, the blends of surfactant and polyelectrolytes exhibited similar dynamic diffusion profiles over time, indicating that polyelectrolytes did not affect the surface activity of surfactants. Additionally, it was observed that the surface tension reduction (after 0.25 s) by surfactants was much lower due to the adsorption of surfactants onto the rock surface. Adding the polyelectrolytes results in a lower surface tension at surface age t, which explains that polyelectrolytes could inhibit the surfactant adsorption, and therefore more bulk surfactants are available to diffuse to the interface and lower the surface tension.

Example 3

A dynamic adsorption test was also conducted. In this test, surfactants and mixtures of surfactants and polyelectrolytes of three different molecular weights were pumped into a column packed with 100 mesh core powders from a shale formation, respectively. Table 3 below shows the samples that were tested.

TABLE 3

Sample Compositions for Dynamic Adsorption Test

| Sample Number | Surfactant | Polyelectrolyte |
|---|---|---|
| 1 | Blend at 1 GPT | SP (MW = 1200) at 2.5 GPT |
| 2 | Blend at 1 GPT | SP (MW = 4500) at 2.5 GPT |
| 3 | Blend at 1 GPT | SP (MW = 15000) at 2.5 GPT |
| 4 | Blend at 1 GPT | None |

Figure 7:
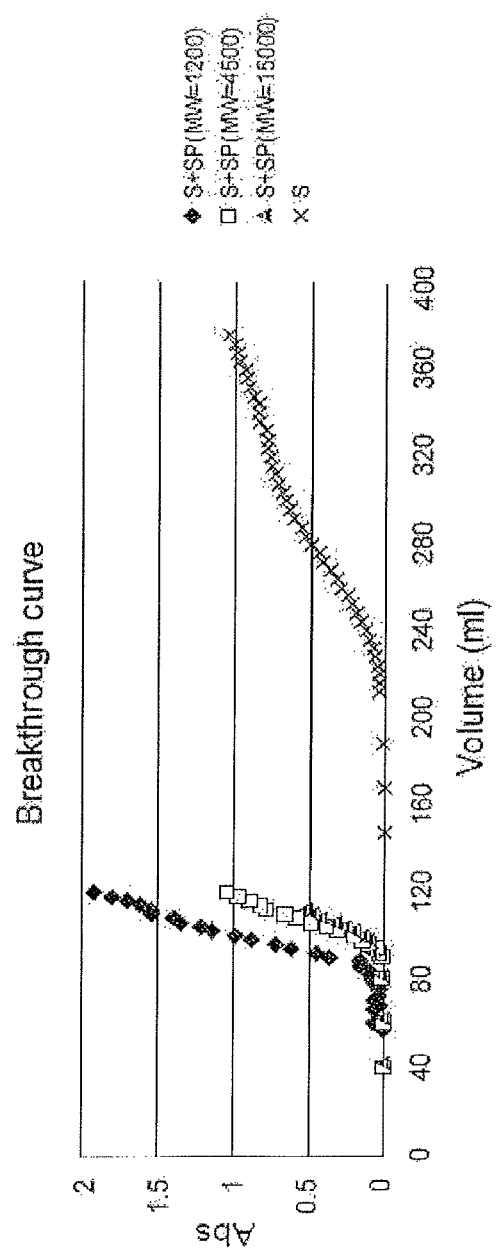
FIG. 7 is a graph that illustrates the results of a dynamic adsorption test of embodiments of the present disclosure.

As shown in FIG. 7, it was observed that the combinations of surfactant and polyelectrolytes broke through much earlier (at 80 ml) than pure surfactants (at 220 ml), indicating that surfactant adsorption was much reduced. Additionally, the results indicate that low molecular weight polyelectrolytes (1200) performed the best. The reduction of surfactant adsorption was consistent with that observed in the static adsorption tests.

Example 4

Figure 8:
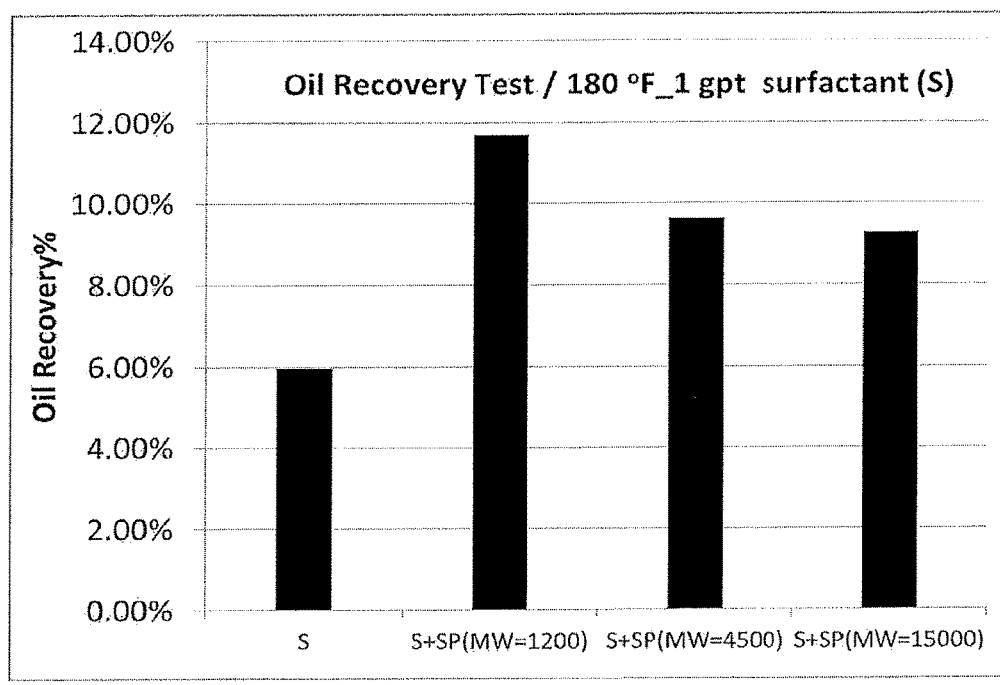
FIG. 8 is a graph that illustrates the results of an oil recovery test of embodiments of the present disclosure.

An oil recovery test was also performed. In this test, surfactants and mixtures of surfactants and polyelectrolytes of three different molecular weights (1200, 4500, and 15000) were pumped into a column packed with 100 mesh core powders that are saturated with crude oil (Well of Rogers #2H, the Eagle ford shale) respectively. The oil recovery data shown in FIG. 8 indicate that the combinations of surfactant and polyelectrolytes yielded higher oil recovery. Additionally, the lower weight polyelectrolytes led to a higher percentage of oil recovery.

Example 5

A series of tests were performed to compare the effectiveness of sequential injection of polyelectrolytes followed by surfactant versus the simultaneous injection of both compounds. In each test, surface tension was measured as a function of time under five experimental conditions: (A) an aqueous fluid, (B) the aqueous fluid with a surfactant (anionic and nonionic surfactant mixture, concentration 1 gpt), (C) the aqueous fluid with the surfactant in the presence of a formation sample (i.e., rock sample), (D) the aqueous fluid with a simultaneous injection of polyelectrolyte (concentration 2.5 gpt) and surfactant in the presence of the formation sample, and (E) the aqueous fluid with a sequential injection of polyelectrolyte and surfactant in the presence of the formation sample. Deionized water and 4% potassium chloride were both tested as aqueous fluids. Indiana limestone and Rainbow shale rocks were both tested as formation samples.

Figure 9:
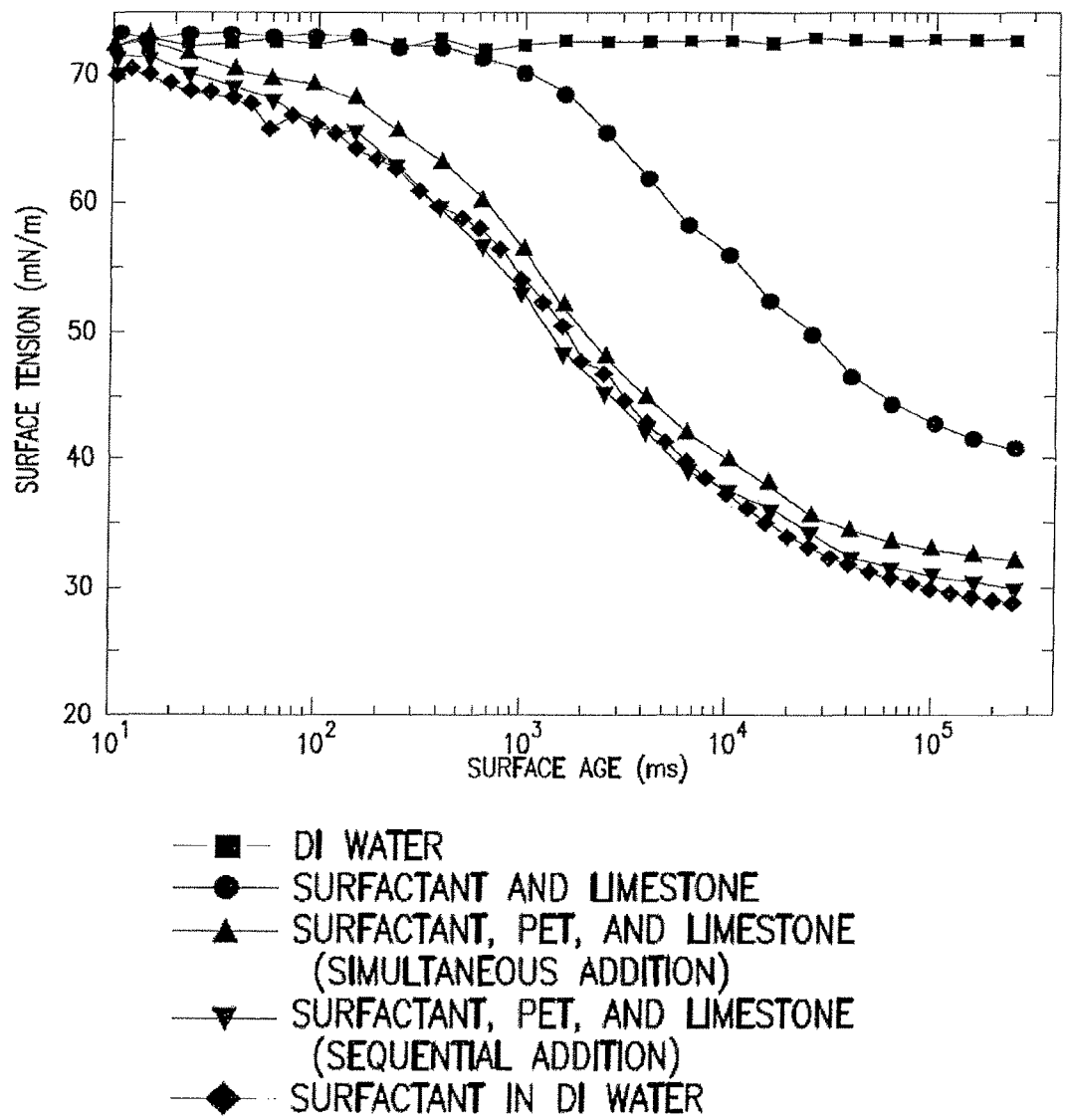
FIG. 9 is a graph that illustrates the difference between the simultaneous addition versus the sequential addition of a sacrificial agent and a surfactant when contacting limestone in deionized water in accordance with certain embodiments of the present disclosure.
Figure 10:
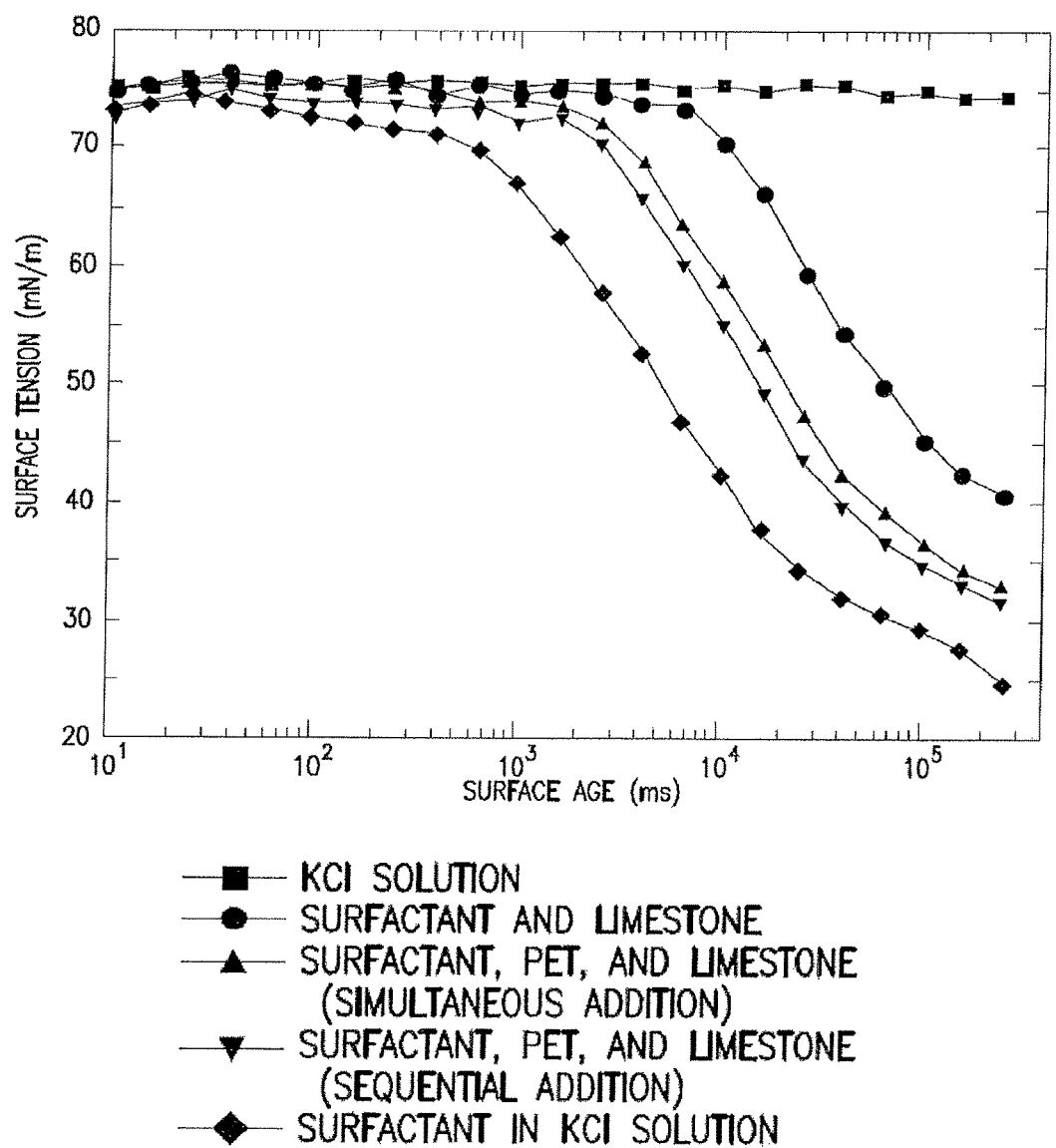
FIG. 10 is a graph that illustrates is a graph that illustrates the difference between the simultaneous addition versus the sequential addition of a sacrificial agent and a surfactant when contacting limestone in potassium chloride solution in accordance with certain embodiments of the present disclosure.
Figure 11:
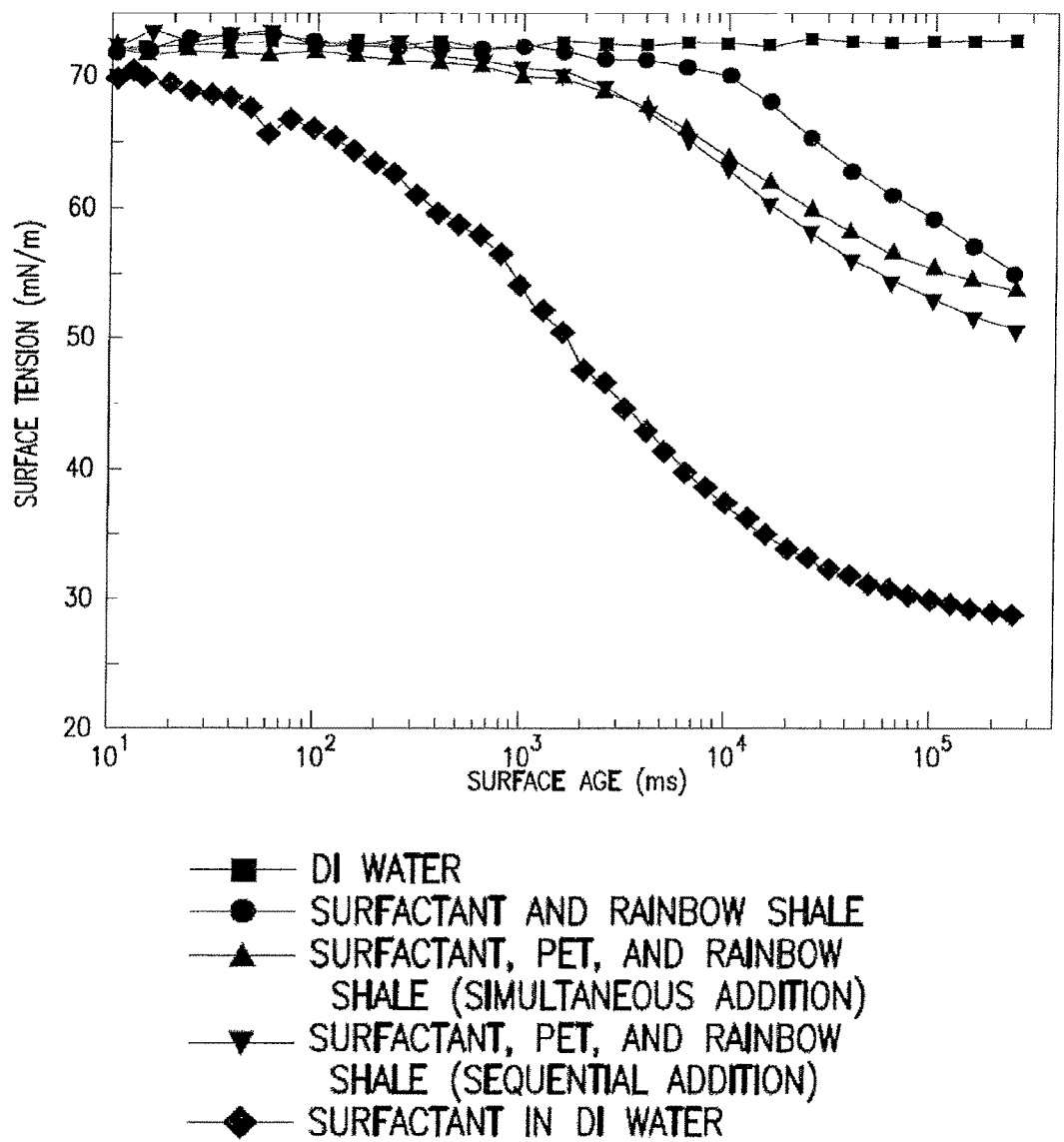
FIG. 11 is a graph that illustrates is a graph that illustrates the difference between the simultaneous addition versus the sequential addition of a sacrificial agent and a surfactant when contacting Rainbow shale rocks in deionized water in accordance with certain embodiments of the present disclosure.
Figure 12:
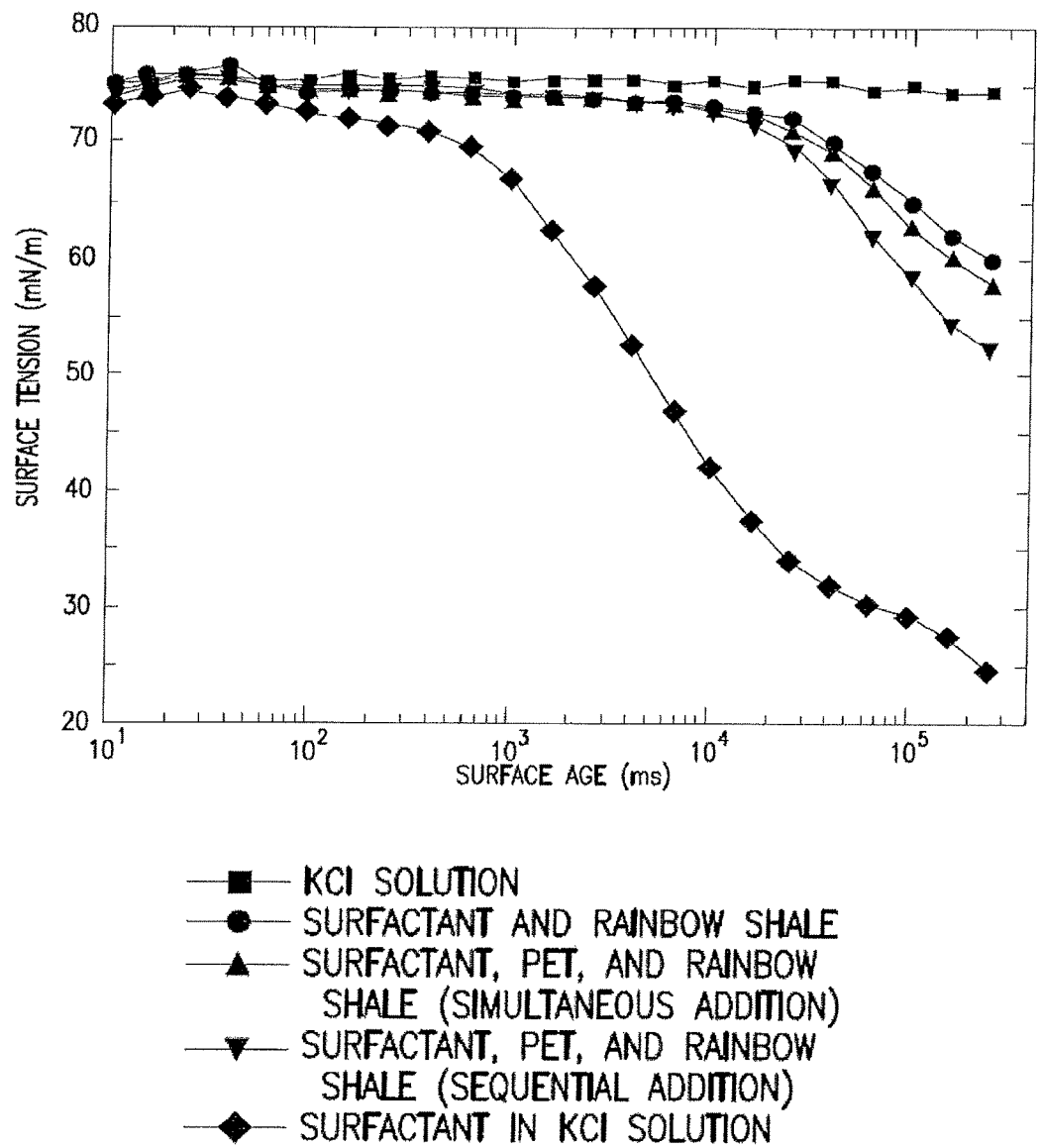
FIG. 12 is a graph that illustrates is a graph that illustrates the difference between the simultaneous addition versus the sequential addition of a sacrificial agent and a surfactant when contacting Rainbow shale rocks in potassium chloride solution in accordance with certain embodiments of the present disclosure.

FIGS. 9-12 illustrate the results of these tests. FIG. 9 illustrates the result of the tests using deionized water and Indiana limestone. FIG. 10 illustrates the result of the tests using a potassium chloride solution and Indiana limestone. FIG. 11 illustrates the result of the tests using deionized water and Rainbow shale rocks. FIG. 12 illustrates the result of the tests using a potassium chloride solution and Rainbow shale rocks.

The figures show that the surface tension remained higher under all conditions when the surfactant and the polyelectrolyte were injected simultaneously than when they were injected sequentially. The higher surface tension indicates more of the surfactant was unavailable to lower the surface tension because it had adsorbed to the limestone or shale rock. Introducing the polyelectrolyte and the surfactant sequentially prevented the surfactant from adsorbing to the rock and resulted in a lower surface tension.

An embodiment of the present disclosure is a method comprising: introducing a first treatment fluid comprising an aqueous base fluid and a polyelectrolyte into a wellbore penetrating at least a portion of a subterranean formation; contacting at least a portion of the subterranean formation with the polyelectrolyte; and introducing a second treatment fluid comprising an aqueous base fluid and a surfactant into the wellbore penetrating at least the portion of the subterranean formation. Optionally, the second treatment fluid is a fracturing fluid, an acidizing fluid, or a drilling fluid. Optionally, the surfactant comprises at least one surfactant selected from the group consisting of sodium, potassium, and ammonium salts of long chain alkyl sulfonates and alkyl aryl sulfonates; dialkyl sodium sulfosuccinates; alkyl sulfates; alkyl sulfonates; alkoxylated sulfates; ethoxylated alcohols; polyglucosides; ethoxylated long-chain alcohols; alkyl ammonium bromides; hydroxysultaines; and any combination thereof. Optionally, the polyelectrolyte comprises at least one polyelectrolyte selected from the group consisting of polyacrylate, poly(styrenesulfonic acid), poly(2-acrylamido-2-methyl-1-propane sulfonic acid), sulfonated poly(ether ether ketone), sulfonated lignin, poly(ethylenesulfonic acid), poly(methacryloxyethylsulfonic acid), poly(acrylic acid), poly(methacrylic acid), HV-sodium alginate, sodium alginate, sodium hyaluronate, heparin sulfate, cellulose sulfate, kappa carrageenan, pentasodium tripolyphosphate, low-esterified pectin(polygalacturonic acid), polyglutamic acid, carboxymethylcellulose, chondroitin sulfate-6, chondroitin sulfate-4, collagen, polyalkylene imines, polyethylene polyamine, polypropylene polyamine, polyvinylamine, polyallylamine, poly(vinylalcohol/vinylamine), chitosan, polylysine, polymyxin, spermine hydrochloride, protamine sulfate, poly(methylene-co-guanidine) hydrochloride, polythethylenimine-ethoxylated, polyethylenimine-ex-ichlorhydrin modified, and any combination thereof. Optionally, the polyelectrolyte has a molecular weight of about 100 Daltons to about 300,000 Daltons. Optionally, the polyelectrolyte and the surfactant are both anionic. Optionally, the subterranean formation is an unconventional formation. Optionally, the unconventional formation is a shale play. Optionally, the second treatment fluid further comprises an acid. Optionally, the second treatment fluid is injected into the wellbore using one or more pumps.

Another embodiment of the present disclosure is a method comprising: introducing a first treatment fluid comprising an aqueous base fluid and a polyelectrolyte into a wellbore penetrating at least a portion of a subterranean formation; contacting at least a portion of the subterranean formation with the polyelectrolyte; and introducing a second treatment fluid comprising an aqueous base fluid and a surfactant into the wellbore penetrating at least the portion of the subterranean formation at a pressure sufficient to create or enhance one or more fractures within the subterranean formation. Optionally, the surfactant comprises at least one surfactant selected from the group consisting of sodium, potassium, and ammonium salts of long chain alkyl sulfonates and alkyl aryl sulfonates; dialkyl sodium sulfosuccinates; alkyl sulfates; alkyl sulfonates; alkoxylated sulfates; ethoxylated alcohols; polyglucosides; ethoxylated long-chain alcohols; alkyl ammonium bromides; hydroxysultaines; and any combination thereof. Optionally, the polyelectrolyte comprises at least one polyelectrolyte selected from the group consisting of polyacrylate, poly(styrenesulfonic acid), poly(2-acrylamido-2-methyl-1-propane sulfonic acid), sulfonated poly(ether ether ketone), sulfonated lignin, poly (ethylenesulfonic acid), poly(methacryloxyethylsulfonic acid), poly(acrylic acid), poly(methacrylic acid), HV-sodium alginate, sodium alginate, sodium hyaluronate, heparin sulfate, cellulose sulfate, kappa carrageenan, pentasodium tripolyphosphate, low-esterified pectin(polygalacturonic acid), polyglutamic acid, carboxymethylcellulose, chondroitin sulfate-6, chondroitin sulfate-4, collagen, polyalkylene imines, polyethylene polyamine, polypropylene polyamine, polyvinylamine, polyallylamine, poly(vinylalcohol/vinylamine), chitosan, polylysine, polymyxin, spermine hydrochloride, protamine sulfate, poly(methylene-co-guanidine) hydrochloride, polythethylenimine-ethoxylated, polyethylenimine-ex-ichlorhydrin modified, and any combination thereof. Optionally, the polyelectrolyte has a molecular weight of about 100 Daltons to about 300,000 Daltons. Optionally, the polyelectrolyte and the surfactant are both anionic. Optionally, the subterranean formation is an unconventional formation. Optionally, the unconventional formation is a shale play. Optionally, the second treatment fluid further comprises an acid. Optionally, the second treatment fluid further comprises a plurality of proppant particles. Optionally, the second treatment fluid is injected into the wellbore using one or more pumps.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
   introducing a first treatment fluid comprising an aqueous base fluid and a polyelectrolyte with a molecular weight of from about 100 Daltons to about 15,000 Daltons into a wellbore penetrating at least a portion of a subterranean formation that comprises shale, wherein the polyelectrolyte comprises at least one polyelectrolyte selected from the group consisting of a polyacrylic acid, a polyacrylate, and any combination thereof;
   contacting at least a portion of the subterranean formation with the polyelectrolyte; and
   introducing a second treatment fluid comprising an aqueous base fluid and a surfactant into the wellbore penetrating at least the portion of the subterranean formation at or above a pressure sufficient to create or enhance one or more fractures in the subterranean formation, wherein the surfactant is present in the second treatment fluid in an amount sufficient to form an oil-in-acid or an oil-in-water emulsion in the portion of the subterranean formation,
   wherein the step of contacting at least a portion of the subterranean formation with the polyelectrolyte prevents the surfactant from adsorbing on the subterranean formation.

2. The method of claim 1 wherein the surfactant comprises at least one surfactant selected from the group consisting of sodium, potassium, and ammonium salts of long chain alkyl sulfonates and alkyl aryl sulfonates; dialkyl sodium sulfosuccinates; alkyl sulfates; alkyl sulfonates; alkoxylated sulfates; ethoxylated alcohols; polyglucosides; ethoxylated long-chain alcohols; alkyl ammonium bromides; hydroxysultaines; and any combination thereof.

3. The method of claim 1 wherein the polyelectrolyte has a molecular weight of from about 1,200 Daltons to about 15,000 Daltons.

4. The method of claim 1 wherein the polyelectrolyte and the surfactant are both anionic.

5. The method of claim 1 wherein the subterranean formation is an unconventional formation.

6. The method of claim 1 wherein the second treatment fluid further comprises an acid.

7. The method of claim 1 wherein the second treatment fluid is injected into the wellbore using one or more pumps.

8. The method of claim 1 wherein the concentration of the surfactant and the concentration of the polyelectrolyte have a ratio of about 1 to about 2.5.

9. A method comprising:
   introducing a first treatment fluid comprising an aqueous base fluid and a polyelectrolyte with a molecular weight of from about 100 Daltons to about 15,000 Daltons into a wellbore penetrating at least a portion of a subterranean formation that comprises shale, wherein the polyelectrolyte comprises at least one polyelectrolyte selected from the group consisting of a polyacrylic acid, a polyacrylate, and any combination thereof;
   contacting at least a portion of the subterranean formation with the polyelectrolyte; and
   introducing a second treatment fluid comprising an aqueous base fluid, a plurality of proppant particles, and a surfactant into the wellbore penetrating at least the portion of the subterranean formation at a pressure sufficient to create or enhance one or more fractures within the subterranean formation, wherein the surfactant is present in the second treatment fluid in an amount sufficient to form an oil-in-acid or an oil-in-water emulsion in the portion of the subterranean formation,
   wherein the step of contacting at least a portion of the subterranean formation with the polyelectrolyte prevents the surfactant from adsorbing on the subterranean formation.

10. The method of claim 9 wherein the surfactant comprises at least one surfactant selected from the group consisting of sodium, potassium, and ammonium salts of long chain alkyl sulfonates and alkyl aryl sulfonates; dialkyl sodium sulfosuccinates; alkyl sulfates; alkyl sulfonates; alkoxylated sulfates; ethoxylated alcohols; polyglucosides; ethoxylated long-chain alcohols; alkyl ammonium bromides; hydroxysultaines; and any combination thereof.

11. The method of claim 9 wherein the polyelectrolyte has a molecular weight of from about 1,200 Daltons to about 15,000 Daltons.

12. The method of claim 9 wherein the polyelectrolyte and the surfactant are both anionic.

13. The method of claim 9 wherein the subterranean formation is an unconventional formation.

14. The method of claim 9 wherein the second treatment fluid further comprises an acid.

15. The method of claim 9 wherein the second treatment fluid is injected into the wellbore using one or more pumps.

16. The method of claim 9 wherein the concentration of the surfactant and the concentration of the polyelectrolyte have a ratio of about 1 to about 2.5.

* * * * *